US009806894B2

United States Patent
Kozloski et al.

(10) Patent No.: US 9,806,894 B2
(45) Date of Patent: *Oct. 31, 2017

(54) VIRTUAL MEETINGS

(71) Applicant: International Business Machines Corporation, Armonk, NY (US)

(72) Inventors: James R. Kozloski, Fairfield, CT (US); Clifford A. Pickover, Yorktown Heights, NY (US); Robert W. Wisniewski, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 13/661,230

(22) Filed: Oct. 26, 2012

(65) Prior Publication Data

US 2014/0123027 A1    May 1, 2014

(51) Int. Cl.
  *G06F 3/048*   (2013.01)
  *H04L 12/18*   (2006.01)
  *G06Q 10/10*   (2012.01)

(52) U.S. Cl.
  CPC ..... *H04L 12/1827* (2013.01); *G06Q 10/1095* (2013.01); *H04L 12/1818* (2013.01)

(58) Field of Classification Search
  CPC ..... G06F 3/048; G06F 3/0481; H04L 65/403; H04L 12/1827; H04L 12/1818; H04M 2201/42; G06Q 10/10
  USPC ................. 715/753, 756, 767, 802
  See application file for complete search history.

(56) References Cited

U.S. PATENT DOCUMENTS

| 5,805,830 | A | 9/1998 | Reese et al. |
|---|---|---|---|
| 5,999,208 | A | 12/1999 | McNerney et al. |
| 7,373,608 | B2 * | 5/2008 | Lentz ............................ 715/753 |
| 7,412,392 | B1 * | 8/2008 | Satapathy .................. 704/270.1 |
| 7,454,460 | B2 * | 11/2008 | Ivashin ............. H04L 29/06027 348/14.09 |
| 7,503,006 | B2 | 3/2009 | Danieli |
| 7,542,068 | B2 | 6/2009 | Eshkoli et al. |

(Continued)

FOREIGN PATENT DOCUMENTS

| CN | 101853132 A | 10/2010 |
|---|---|---|
| CN | 101854247 A | 10/2010 |

OTHER PUBLICATIONS

International Search Report for Application No. PCT/US13/49012; International Filing Date: Jul. 2, 2013; date of Mailing Jan. 22, 2014; 10 pgs.

(Continued)

*Primary Examiner* — Doon Chow
*Assistant Examiner* — Andrew T Chiusano
(74) *Attorney, Agent, or Firm* — Cantor Colburn LLP; Vazken Alexanian

(57) ABSTRACT

A method for managing virtual meetings includes initiating participation with a first user interface in a first meeting, initiating participation with the first user interface in a second meeting, determining whether attention of a user is directed towards the first meeting or the second meeting, and configuring the user interface such that the user interacts with meeting resources associated with the first meeting responsive to determining that the attention of the user is directed towards the first meeting.

9 Claims, 12 Drawing Sheets

(56) References Cited

U.S. PATENT DOCUMENTS

| | | | |
|---|---|---|---|
| 7,634,540 | B2 | 12/2009 | Ivashin et al. |
| 7,870,494 | B2 * | 1/2011 | Lentz .......................... 715/753 |
| 8,549,414 | B2 | 10/2013 | Hoard et al. |
| 2007/0005754 | A1 * | 1/2007 | Horvitz ................... H04L 67/22 709/224 |
| 2007/0150583 | A1 * | 6/2007 | Asthana ................. G06Q 10/06 709/224 |
| 2008/0297589 | A1 | 12/2008 | Kurtz et al. |
| 2010/0034366 | A1 | 2/2010 | Basson et al. |
| 2010/0037151 | A1 | 2/2010 | Ackerman et al. |
| 2010/0106558 | A1 | 4/2010 | Li et al. |
| 2010/0208880 | A1 * | 8/2010 | Gartner .................... 379/202.01 |
| 2010/0246800 | A1 | 9/2010 | Geppert et al. |
| 2010/0251140 | A1 | 9/2010 | Tipirneni |
| 2010/0325576 | A1 | 12/2010 | Olsen |
| 2011/0113351 | A1 * | 5/2011 | Phillips .......................... 715/757 |
| 2011/0145744 | A1 | 6/2011 | Haynes et al. |
| 2011/0153768 | A1 * | 6/2011 | Carter ................... G06Q 10/10 709/207 |
| 2011/0167136 | A1 * | 7/2011 | Naimark et al. .............. 709/219 |
| 2011/0268263 | A1 * | 11/2011 | Jones et al. .............. 379/202.01 |
| 2012/0079099 | A1 * | 3/2012 | Dhara ................. G06Q 10/107 709/224 |
| 2012/0224021 | A1 * | 9/2012 | Begeja et al. ............. 348/14.08 |
| 2013/0124623 | A1 * | 5/2013 | Munter ......................... 709/204 |
| 2013/0239024 | A1 * | 9/2013 | Lewis et al. ................. 715/756 |
| 2013/0254279 | A1 | 9/2013 | Bentley et al. |

OTHER PUBLICATIONS

Written Opinion for Application No. PCT/US13/49012; International Filing Date: Jul. 2, 2013; Date of Mailing: Jan. 22, 2014; 10 pgs.

IP.com Prior Art Database Technical Disclosure, Disclosed Anonymously, "Method and System for Supporting Multiple Simultaneous Conferences Using a Single Communication Device," Aug. 26, 2010; 3 pgs.

Rienks, et al., "Detection and Application of Influence Rankins in Small Group Meetings", ICMI '06, Nov. 2-4, 2006, 8 pages.

Vin, Harrick M., et al. "Multimedia Conferencing in the Etherphone Environment", Computer, vol. 24, Issue 10, 1991 IEEE, Oct. 1991, pp. 69-79.

Wellner et al., "Browsing Recorded Meetings with Ferret", Research Report, dalle Molle Institute for Perceptual Artificial Intelligence, IDIAP-RR-04-32, Jun. 1, 2004, 6 pages.

Chinese Office Action for CN Application No. 201380056268.0 dated Apr. 19, 2017; 19 pgs.

* cited by examiner

VIRTUAL MEETINGS

FIELD OF INVENTION

The present invention relates generally to virtual meetings, and more specifically, to methods and systems involving participating in multiple virtual meetings.

DESCRIPTION OF RELATED ART

Virtual meetings may be conducted between any number of participants using a variety of different technologies. Virtual meetings allow participants to exchange information when located in different locations using teleconferencing, videoconferencing and other virtual presence technologies.

BRIEF SUMMARY

According to one embodiment of the present invention, a method for managing virtual meetings includes initiating participation with a first user interface in a first meeting, initiating participation with the first user interface in a second meeting, determining whether attention of a user is directed towards the first meeting or the second meeting, and configuring the user interface such that the user interacts with meeting resources associated with the first meeting responsive to determining that the attention of the user is directed towards the first meeting.

According to another embodiment of the present invention, a method for managing virtual meetings includes initiating participation with a first user interface in a first meeting, initiating participation with the first user interface in a second meeting, calculating a first composite interest value (CIV) associated with the first meeting and a second CIV associated with the second meeting, determining whether the first CIV is greater than the second CIV, and configuring the user interface such that the user interacts with meeting resources associated with the first meeting responsive to determining that first CIV is greater than the second CIV.

According to yet another embodiment of the present invention, a method for managing virtual meetings includes initiating participation with a first user interface in a first meeting, calculating a first composite interest value (CIV) associated with the first meeting, calculate a second CIV associated with a second meeting, determining whether the second CIV is greater than a threshold value, and initiating participation with the first user interface in the second meeting responsive to determining that the second CIV is greater than the threshold value.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

The prevalence and availability of teleconferencing, videoconferencing, and virtual presence technologies allows people to participate in meetings without being personally present in a particular meeting location. Typically, if a participant has access to a telephone or a computer that may be communicatively connected to the Internet, the user may participate in the meetings regardless of their location. Though the location of a meeting has become less relevant, the time of the meeting continues to constrain participants. Thus, scheduling conflicts may result in a user having multiple meeting obligations at the same time. The systems and methods described below provide meeting participants with an ability to substantively participate in multiple meetings occurring at the same time.

Figure 1:
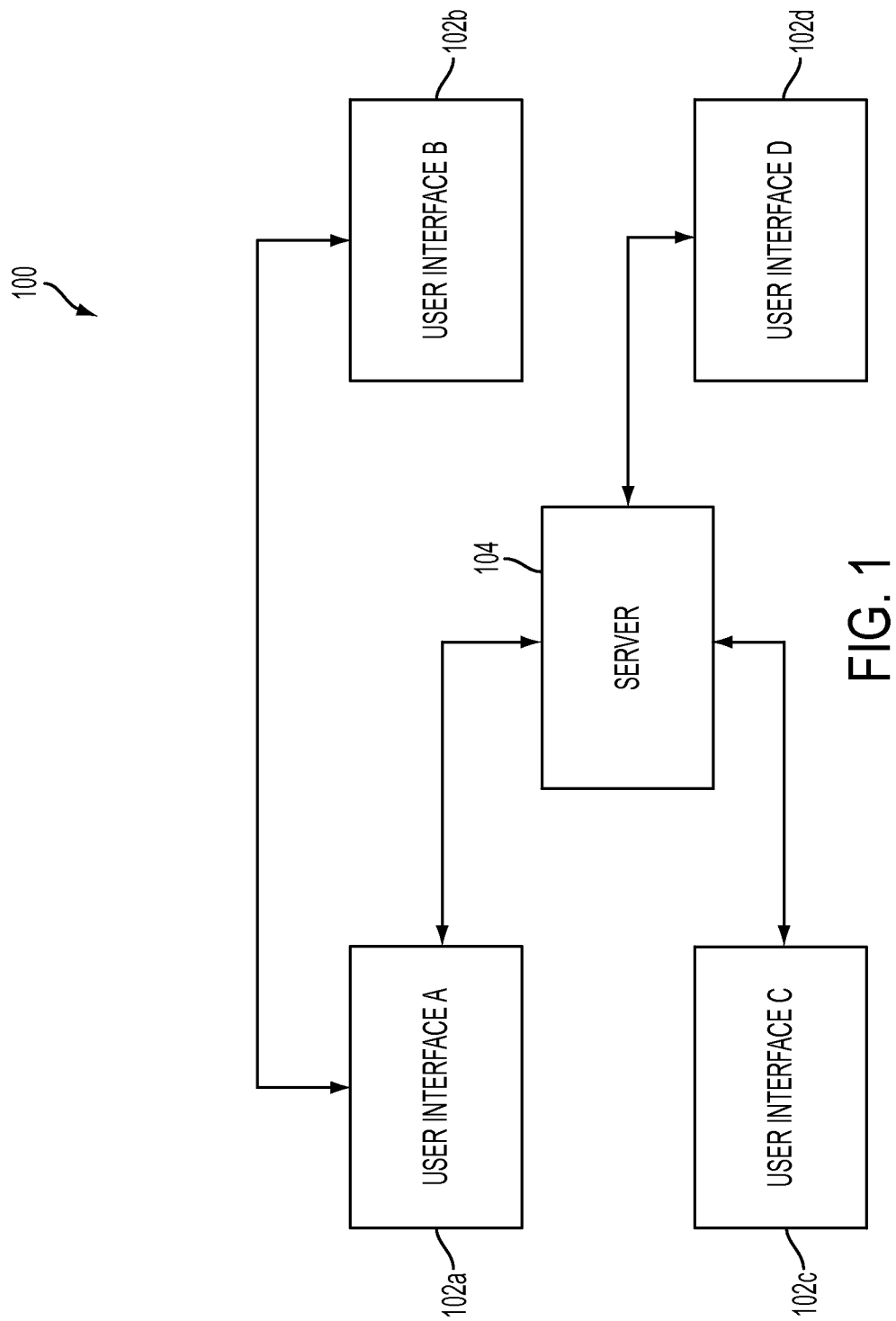
FIG. 1 illustrates an exemplary embodiment of a virtual meeting system.

FIG. 1 illustrates an exemplary embodiment of a virtual meeting system 100 that may include any number of user interfaces 102. In the illustrated embodiment, the user interfaces 102 may include any suitable communications device or number of devices such as, for example, a telephone, a smartphone or tablet, a personal computer, a speakerphone, a videoconferencing system, or any other communications device. The user interfaces 102 may be communicatively connected via a network or the Internet. In the illustrated embodiment, a server 104 is used to facilitate communications between some of the user interfaces 102; however, such a server 104 may not be necessary in some virtual meetings, or may not be used by a particular user interface 102 in a particular meeting. For example, the user interface B 102b may affect a communicative connection with the user interface A 102a to participate in a particular meeting while the user interface A 102a communicates with the user interfaces 102c and 102d via the server 104.

Figure 2:
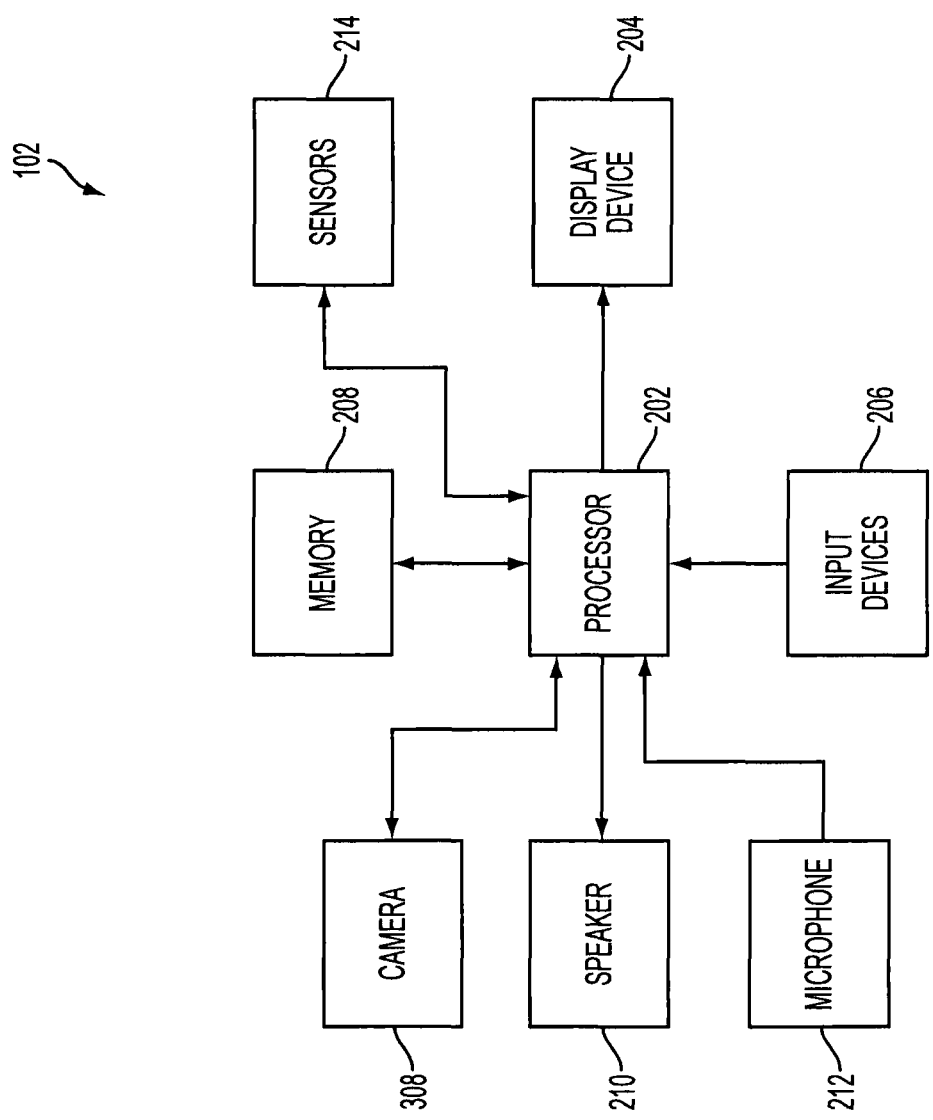
FIG. 2 illustrates an exemplary embodiment of a user interface.

FIG. 2 illustrates an exemplary embodiment of a user interface 102. The user interface 102 may include a processor 202 communicatively connected to a display device, 204, input devices 206, memory 208, a camera, 308, a speaker 210, a microphone 212, and sensors 214. The sensors 214 may include any type of sensors such as, for example, motion sensors or audio sensors that may be operative to collect information or data associated with a user's actions or behavior.

Figure 3:
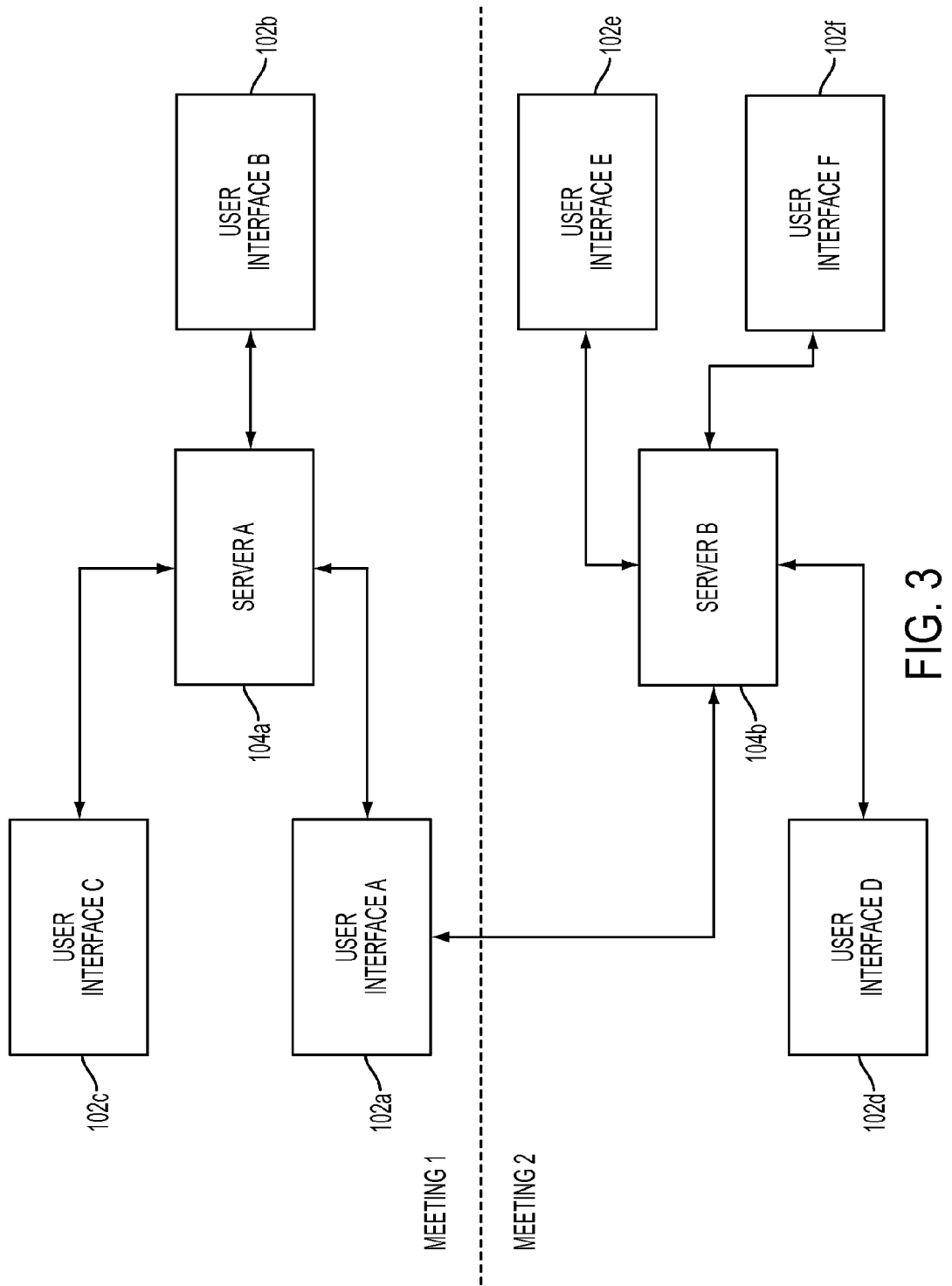
FIG. 3 illustrates an exemplary embodiment of another virtual meeting system.

FIG. 3 illustrates an exemplary embodiment of another virtual meeting system. In the illustrated embodiment, a first meeting (Meeting 1) includes a server A 104a that is facilitating a meeting between the user interfaces 102a-c. A second meeting (Meeting 2) is in progress at the same time as the second meeting and includes a server B 104b that is facilitating a meeting between the user interfaces 102a and 102d-f. Thus, the user interface A 102a is participating in both the first meeting and the second meeting at the same time. The methods and systems described below provide the user using the user interface 102a with an improved user interface for participating in the first meeting and the second meeting at the same time. Though the illustrated embodiment includes two meetings, the embodiments described below may be used to facilitate the user of the user interface 102a to effectively participate in any number of meetings occurring during the same time period or overlapping time periods.

In this regard, previous systems may have allowed a user to be connected to multiple meetings at the same time however, the systems and user interfaces failed to provide the users with the ability to manage their participation in multiple meetings. For example, the user may be able to view multiple video feeds by, for example arranging windows on a computer display where each window displayed a different video feed, however the user's attention typically could only be directed to a single video feed at a time. The textual or audio feeds incur a similar problem. Though a user may, for example be able to toggle between particular audio outputs, or toggle between which meeting they are providing verbal, textual, or graphical input the user may only provide input or receive audio output in one meeting at a time. In other words, though a user interface 102 may provide an ability to be communicatively connected to multiple meetings at the same time, the user has a finite ability to actively participate in multiple meetings at the same time.

In a single meeting with multiple users, a particular participant's interest may only be needed during a particular time in the meeting. For example, an engineer may be participating in a particular meeting to provide technical advice on a particular subject, or may only be needed to participate if a particular subject arises in the meeting. E.g., if a meeting is scheduled to last an hour, the engineer may only be needed to provide five minutes of participation. However, in previous systems, the engineer must direct their attention to the meeting for the entire hour in order know when they need to participate for five minutes. Thus, the engineer cannot direct their attention to other tasks or virtual meetings that they may also be participating in.

The systems and methods described below provide a user interface that facilitates effective participation in multiple meetings, and allows other meeting participants to provide input to the user's interface that may direct the user's attention to a particular meeting when their attention or participation in the particular meeting is desired. For example, if the participants in the meeting described above decide that they would like input from the engineer, they may provide an input through their respective user interfaces 102 that will be received by the engineer's user interface 102. Such an input may indicate to the engineer that their input is desired, the input may also, for example, toggle the audio and visual feeds on the engineer's user interface 102 so that the engineer may actively participate in the meeting. Later, as the engineer's attention and input is not needed, the engineer's user interface 102 may direct the engineer's attention to another meeting.

Figure 4:
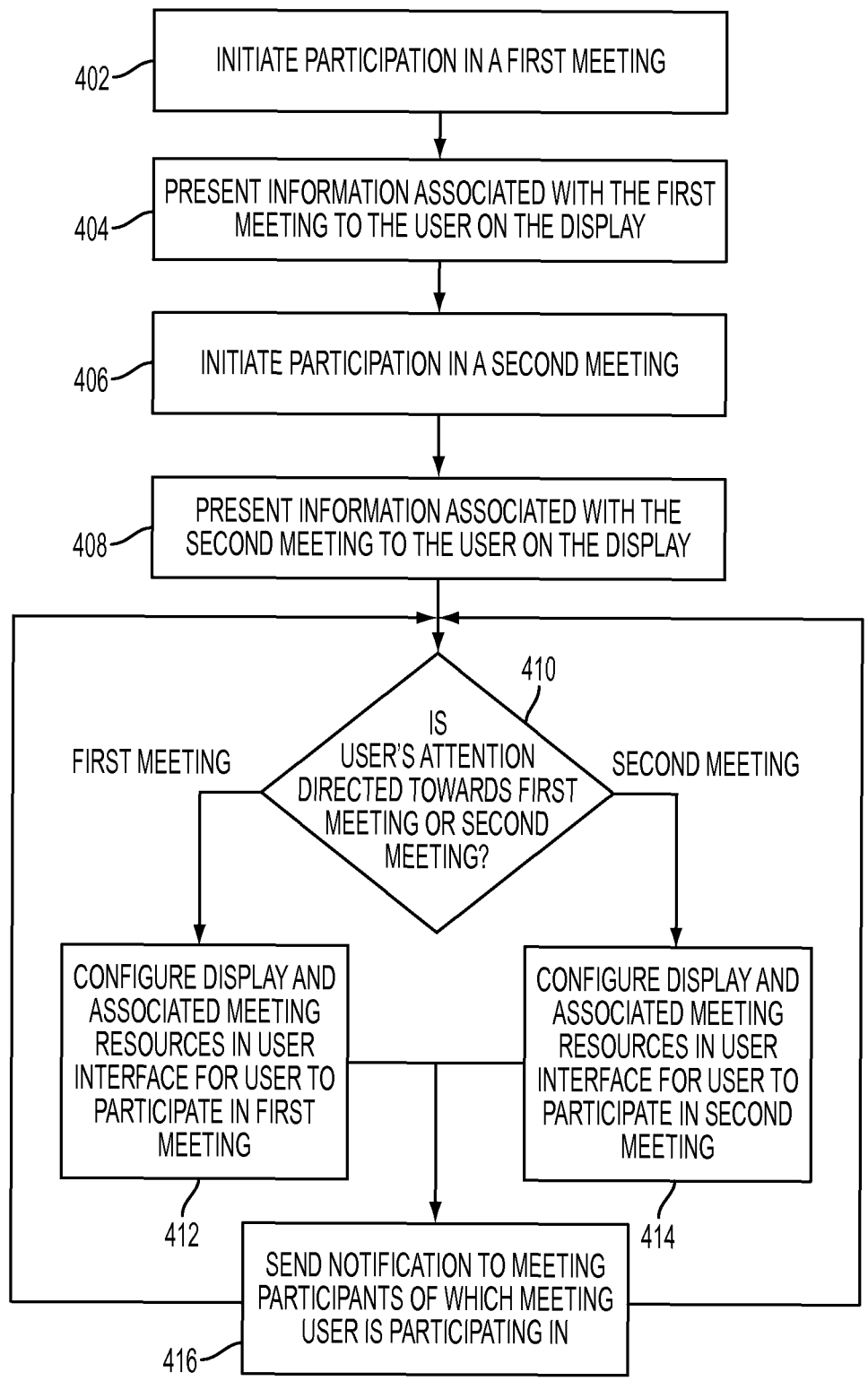
FIG. 4 illustrates a block diagram of an exemplary method for managing user participation in multiple meetings.

FIG. 4 illustrates a block diagram of an exemplary method for managing a user's participation in multiple meetings using a user interface 102 (of FIG. 1). Referring to FIG. 4, in block 402, participation in a first meeting is initiated. Initiating participation may include, for example, affecting a communicative connection between a user interface 102 and other user interfaces 102 that will facilitate the meeting. Meeting resources such as, for example, audio, video, textual, and graphical communications or any combination thereof may be included as meeting resources that are initiated. In block 404, information associated with the first meeting is presented to the user on the display. The user interface 102 may be configured to present the meeting resources associated with the meeting to the user. The configuration of the user interface 102 may include, for example, presenting a video, textual, or graphical communication to the user on the display. Outputting an audio feed of the meeting to the user. Configuring input devices, such as video, audio or textual input devices such that the user may provide input and participate in the meeting using the user interface 102. Participation is initiated in a second meeting in block 406, and information associated with the second meeting is presented to the user on the display in block 408.

The change in configuring the user interface 102 may be gradual or graded in order to convey some continuous measure of a user's state, such as attention. This graded state—as might for example occur when a user has more than one presence (e.g. avatar) in a virtual world or as might occur when a user is paying attention to more than meeting at the same time—may be used for determining an attention value, e.g. a value from 0 to 1. This value may be used to configure the user interface such that the user interacts with meeting resources associated with determining that the attention of the user is directed towards several meetings to varying degrees, and for configuring the user interface such that the user interacts with meeting resources associated with several meetings, responsive to determining that the attention of the user is directed towards several meetings to varying degrees. Additionally, an attention measure, e.g. a value ranging from zero to one, may be directly mapped, onto a transparency value ranging from zero to one of a visual representation of the user, such as an avatar in a virtual universe. Similarly, this continuous value for attention may be used to control other graphical attributes and change avatar characteristics such as: color size, shape, clothing, blink rate, intensity, etc. Similarly, even when used in a traditional GUI environment, this continuous value for attention may be used to control other graphical attributes of any icon representing a user, such as a 2-D icon or image representing a user of the system that changes, color, size, shape, intensity, blink rate, etc In block 410, the user interface 102 determines whether the user's attention is directed towards the first meeting or the second meeting. Such a determination may be made using any number of user inputs other inputs. For example, the user may indicate which meeting they are attentive to by using a mouse or touch screen on a graphical user interface (GUI) to select a particular meeting (e.g., the first meeting or the second meeting). Alternatively, the user interface 102 may use a video input or audio input to monitor a user's actions. Such actions may include, for example, where the user's eyes are directed towards on the display (e.g., if the user is looking at a window presenting a video feed from the first meeting or if the user is looking at another window presenting a video feed from the second meeting), body posture, head alignment, or gestures. Audio input may also be used, for example, voice recognition may be used to determine whether the user has actively selected the first meeting or the second meeting, or whether the context of the user's words indicate which meeting the user has become attentive to. The attention of the user may be quantitatively assessed by the user interface 102, for example, a user may direct their attention to a portion of the display showing content of the first meeting for a particular amount of time. Once the user has shown attention to a particular meeting for a threshold period of time, the user interface 102 may determine that the user is attentive to the particular meeting. Such a determination may include number of indicators that cumulatively define an attention score associated with each meeting that may be compared to an attention threshold such as, for example, any audio input or physical indicators or inputs exhibited by the user.

Once the user interface 102 has determined which meeting the user's attention has been directed towards in block 410, the user interface 102 may configure the display and the meeting resources so that the user may participate in the identified meeting in blocks 412 and 414. Once the display and associated meeting resources have been configured in block 412 or 414, in block 416, a notification of the user's participation in a particular meeting may be sent to the user interfaces 102 of other meeting participants. The other user interfaces 102 may display to their respective users whether the user is attentive to the first meeting or the second meeting. The other user interfaces 102 may present the "status" of the user in the meeting using any number of textual, graphical, or audio indicators such as, for example, a graphical representation of the user, a textual indicator, or visual or video representation of the user. The "status" may be indicated by, for example, changing the textual, graphical, or audio indicators to indicate whether a particular meeting participant is attentive to a particular meeting. This change may be gradual or graded in order to convey some continuous measure of a user's state, such as attention. Thereby, an attention measure ranging from zero to one, may be directly mapped, for example onto a transparency value ranging from zero to one of a visual representation of the user, such as an avatar in a virtual universe.

For example, if the user directs their attention to the first meeting by looking at the window presenting the first meeting on the display, the user interface 102, may increase the size or change the position of the window providing the video feed from the first meeting. The user interface 102, may begin outputting an audio feed associated with the first meeting, or increase the volume of the audio feed. Textual or graphical information such as transcripts of the discussion in the first meeting or graphical slides or diagrams may also be presented to the user. If the user's attention changes to another meeting such as the second meeting, the user interface 102 may be reconfigured in a similar manner to facilitate the users more active participation in the second meeting. The methods and systems described in FIG. 4 include two meetings, alternate embodiments may include any number of meetings managed by the user interface 102 in a similar manner.

A confidence level L may be determined and associated with the probability that a user has in fact altered his attention in a meaningful way. For example, if a user glances at Window 3, corresponding to Meeting 3, for only 0.5 seconds, the confidence level L is lower than if the user glances at Window 3 for 5 seconds. For instance, confidence level may be a mathematical function of duration of the glance and other factors. If a confidence level is not sufficiently high, the system will not assume that a switch in window has changed. The system may boost confidence by taking a confidence-boosting action, such as examining a user's history of glancing, the nature of a user's vocal output, etc. For example, if a user is looking at Window 3 for 1 second, and L is not sufficiently high, the system may monitor the user's speech to increase the confidence level that a Window switch is appropriate.

The use of a confidence level L associated with the audio determination of meeting selection can depend on an analysis of the user's words. For example, if meeting 3 is on the topic of fractals, and the user utters the word "fractal" the confidence level that window 3 is the center of attention is higher than if the user utters the word "privacy"." The use of latent semantic indexing and other known approaches may be used to determine the likely topic of the utterances of a user. The confidence of the topic would usually increase with more words or sentences.

The textual or graphical information presented to the user may include a historical record of the proceedings of a meeting. For example, if a user has not been attentive to a particular meeting, meeting transcripts, video, graphical, or video content of portions or all of the meeting may be presented to the user. Such a presentation allows the user to be updated with earlier proceedings of the meeting and allows the user to contribute to the meeting with a better understanding of the earlier meeting proceedings that were not previously presented to and/or digested by the user.

While the user is viewing the historical content of a particular meeting, an indicator may be presented to the meeting participants on their respective user interfaces 102 to notify the meeting participants that the user is in the process of viewing earlier meeting proceedings. Such an indicator allows the other meeting participants to, for example, wait until the user has "caught up" to the current proceedings before continuing the meeting or engaging the user in the meeting discussion.

Figure 5:
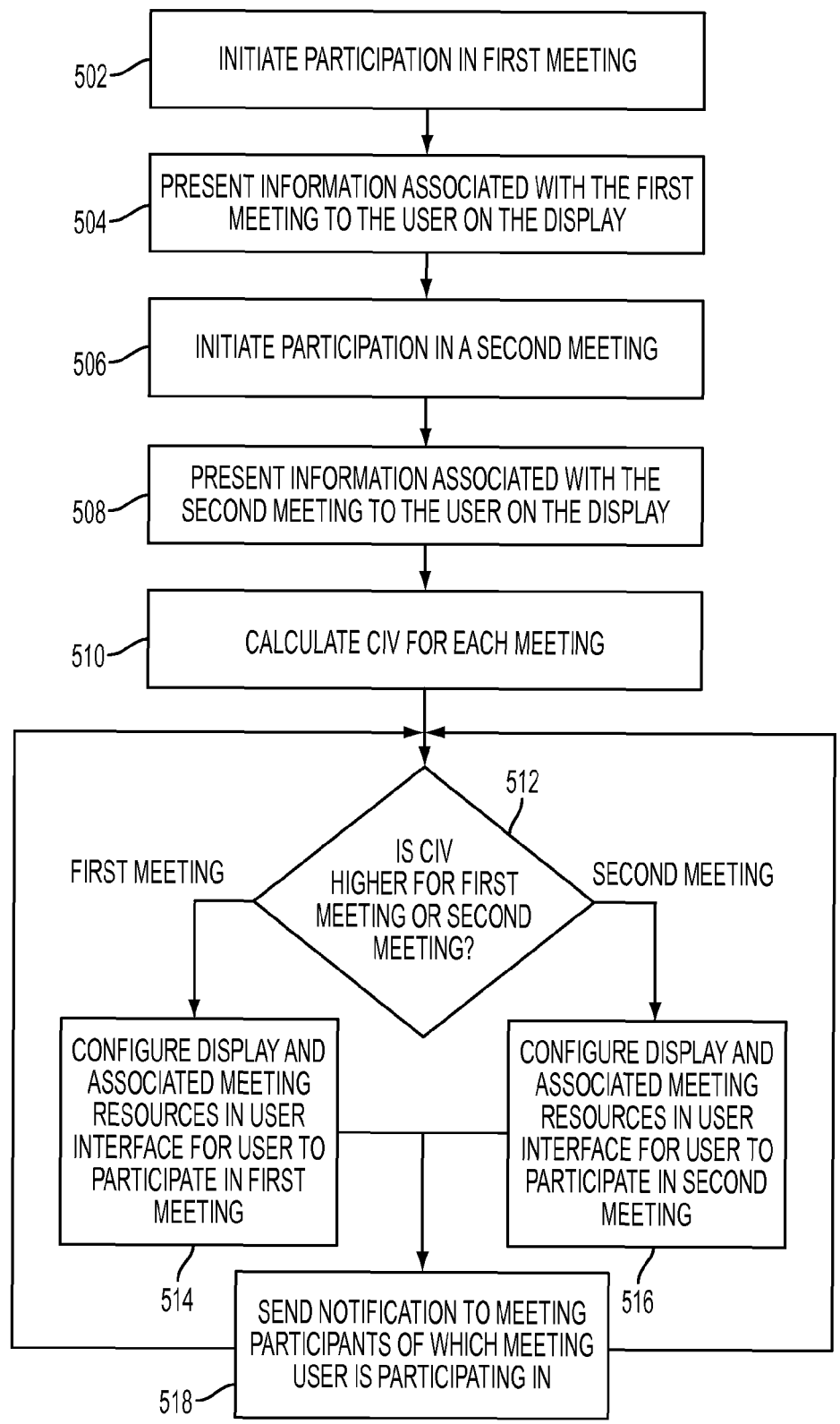
FIG. 5 illustrates a block diagram of another exemplary method for managing user participation in multiple meetings.

FIG. 5 illustrates a block diagram of another method for managing a multiple meetings with a user interface 102. Referring to FIG. 5, in block 502, participation in a first meeting is initiated. In block 504, information associated with the first meeting is presented to the user on the display. Participation is initiated in a second meeting in block 506, and information associated with the second meeting is presented to the user on the display in block 508.

Once the meetings have been initiated, a composite importance value (CIV) may be calculated to identify the relative importance of the two meetings (or any number of meetings if the user is participating in more than two meetings). In this regard, the CIV may include a number of factors such as, for example an automated importance estimate (AIE), a user importance estimate (UIE), and a crowd importance estimate (CIE). The AIE may include for example, latent semantic indexing, the name and nature of the primary speaker (i.e., the speakers importance or position of importance in the organization), an analysis of the number of participants and the nature of the participants in the meeting, the location of the meeting. The UIE may include, for example, a user profile that includes information with the relevance of participants and topics of discussion or specific inputs from the user (e.g., a user's input as to how important they consider the meeting). The CIE may be determined by, for example, crowd sourcing means such as voting by members of a team, or peers (e.g., if a user's team vote the meeting "very important" the CIE may be greater), or may be set by a meeting attendee in order to summon the user of the system to the meeting.

The CIV may be computed as a function of the ME, the UIE, and the CIE or other factors where CIV=f(AIE, UIE, CIE). The CIV function may include weighting factors such that CIV=f($a_1$*AIE, $a_2$*UIE, $a_3$*CIE), where $a_1$, $a_2$, and $a_3$ are weighting factors.

Referring to FIG. 5, the CIV for each meeting is calculated in block 510. In block 512, the user interface 102 determines which meeting has a higher associated CIV, and the user interface 102 configures the display and the associated meeting resources for the user to participate in the meeting with the higher associated CIV in blocks 514 and 516. In block 518, a notification of the user's participation in a particular meeting may be sent to the user interfaces 102 of other meeting participants in a similar manner as discussed above in block 416 (of FIG. 4).

The method described in FIG. 5 may be used alone or in combination with the method described in FIG. 4 to more effectively manage multiple meetings with the user interface 102. For example, though the user interface 102 may be configured so that the user may actively participate in the first meeting in block 514 (of FIG. 5), if the user's attention is directed towards the second meeting as determined in block 410 (of FIG. 5), the display may be subsequently configured in block 414. The attention of the user as determined in block 410 may also be used as a factor in the CIV calculation. In this regard, a user attention estimate (UAE) may be determined based on a number of user inputs similar to the inputs described above in FIG. 4. The CIV may include the UAE where CIV=f($a_1$*AIE, $a_2$*UIE, $a_3$*CIE, $a_4$*UAE). The weights of the "a" values may be configured by the user based on the user's preferences. Alternatively, the weights of the "a" values may be adjusted by the user interface 102 according to identified habits or prevalent behaviors of the user.

Figure 6:
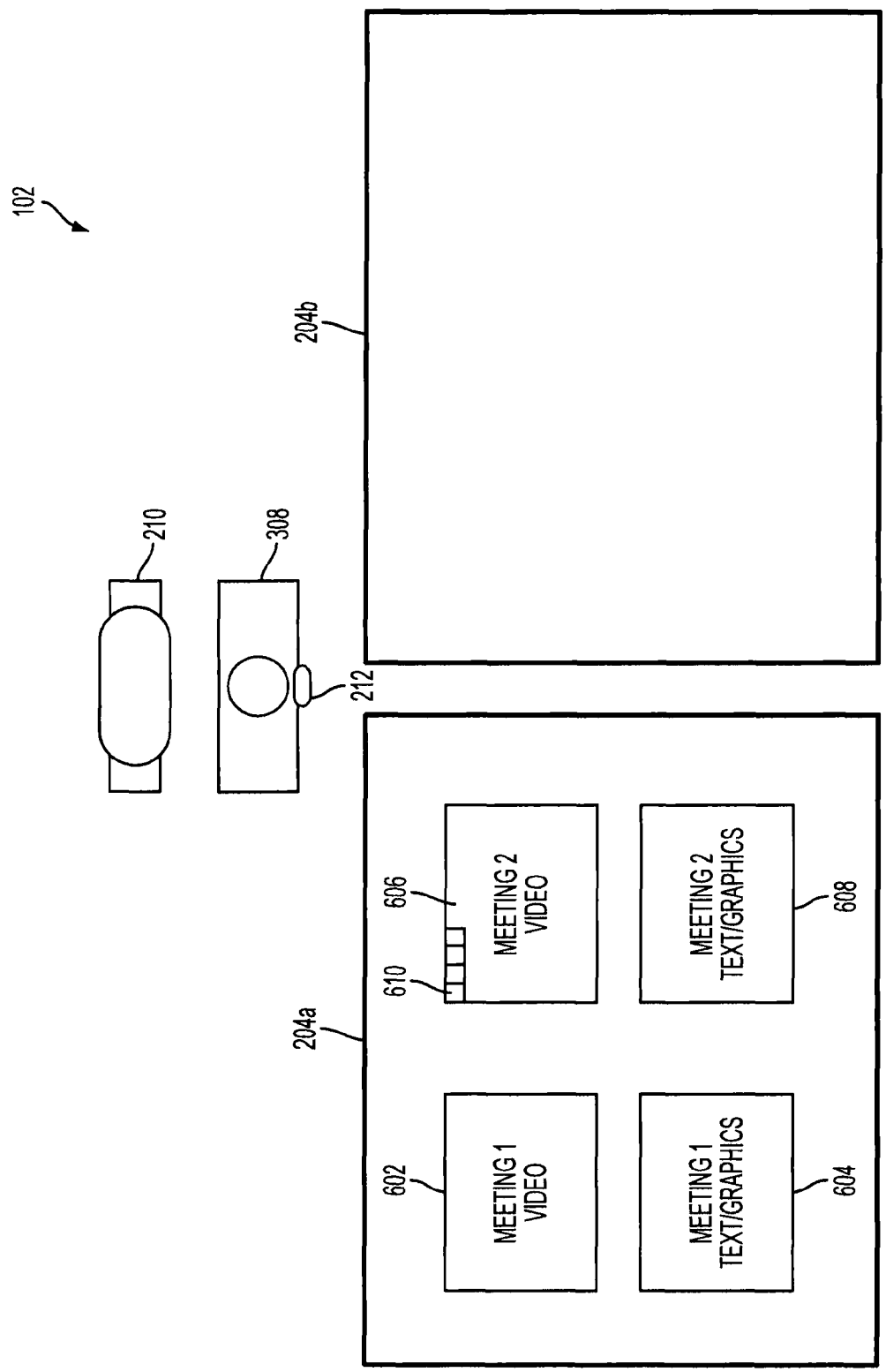
FIG. 6 illustrates an exemplary embodiment of a user interface.

FIG. 6 illustrates an exemplary embodiment of a user interface 102. The user interface 102 includes a first display 204a and a second display 204b, a camera 308, a microphone 212, and a speaker 210. The first display is presenting a window 602 that includes a video feed associated with the first meeting, a window 604 that is displaying text and/or graphics associated with the first meeting, a window 606 that is displaying a video feed associated with the second meeting, and a window 608 that includes text and/or graphics associated with the second meeting. A participant status indicator 610 may be presented to the user. The participant status indicator 610 may include an identifier such as, a textual, or graphical identifier of participants in a particular meeting. The participant status indicator 610 may indicate to the user the status or attention of other meeting participants in the associated meeting. For example, another meeting participant may have a low participation in or attention to a particular meeting (E.g., The meeting participant is participating in another meeting and is not actively attentive to the associated meeting). In such an example, the participant's status indicator 610 would indicate to other meeting participants the relatively low participation of the user in the meeting.

Figure 7:
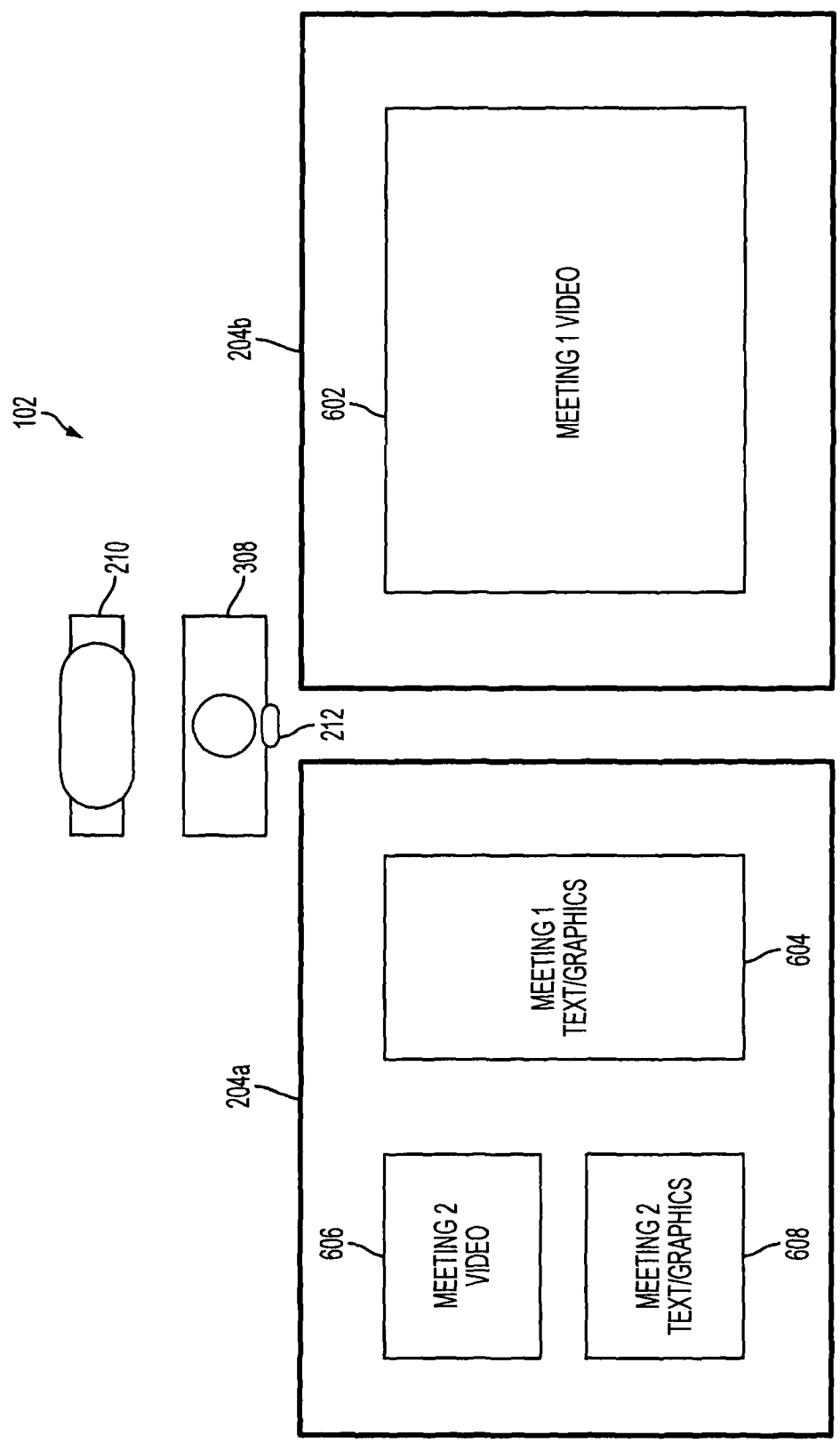
FIG. 7 illustrates an exemplary configuration of the user interface.

FIG. 7 illustrates an exemplary configuration of the user interface 102 that may be presented to a user in for example blocks 412 (of FIG. 4) or 514 (of FIG. 5). Referring to FIG. 7, window 602 that includes a video feed associated with the first meeting has been moved to the second display 204b and increased in size. The window 604 that includes text and/or graphical data associated with the first meeting has been moved and increased in size in the first display 204a. The windows 606 and 608 that are associated with the second meeting have been shifted to a secondary position in the first display 204a. The speaker 210 may be configured to output audio associated with the first meeting, and the microphone and camera, may be configured to receive inputs from the user that may be presented to other participants in the first meeting. Other input devices such as, for example, keyboards or GUI input devices may be configured to provide user inputs to the first meeting participants.

Figure 8:
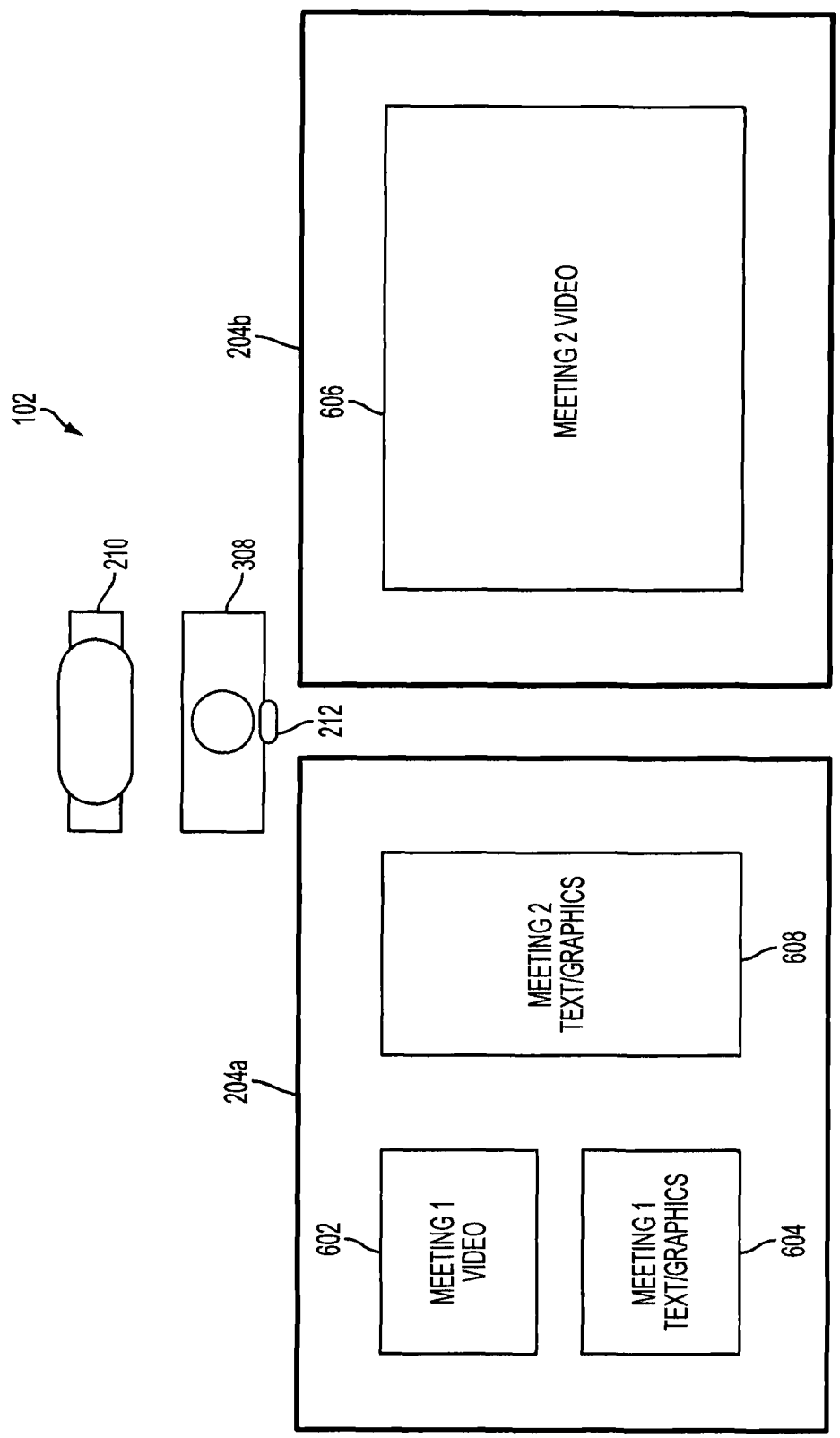
FIG. 8 illustrates another exemplary configuration of the user interface.

FIG. 8 illustrates an exemplary configuration of the user interface 102 that may be presented to a user as in for example blocks 414 (of FIG. 4) or 516 (of FIG. 5). Referring to FIG. 8, the user interface 102 has been configured for the user to more actively participate in the second meeting. The window 602 that includes a video feed associated with the first meeting has been moved to the first display 204b and decreased in size. The window 604 that includes text and/or graphical data associated with the first meeting has been moved and decreased in size in the first display 204a. The window 606 that is associated with a video feed of the second meeting has been moved to the second display 204b and increased in size an the window 608 that includes text and/or graphical data associated with the second meeting has been moved and increased in size in the first display 204a. The speaker 210 may be configured to output audio associated with the first meeting, and the microphone and camera, may be configured to receive inputs from the user that may be presented to other participants in the first meeting. Other input devices, such as, for example keyboards or GUI input devices may be configured to provide user inputs to the first meeting participants.

Though the illustrated embodiments of FIGS. 6-8 include two displays 204 alternate embodiments of the user interface 102 may include, for example, a single display or multiple displays. The hardware associated with the user interface 102 may include any type of input or output devices. For example, the methods described above, may be performed on a smartphone or tablet with a GUI that may present any number of meeting resources from multiple meetings that may be configured for a variety of levels of participation by a user. The exemplary configurations of the user interface 102 are merely examples, any suitable arrangement of the graphical, audio, or video outputs and inputs may be used responsive to the determinations described in FIGS. 4 and 5. These configurations may be changed by a user or system administrator based on the user's preferences.

A user may also participate in multiple meetings using different meeting resources, for example, referring to FIG. 8, the user may input text or other user inputs in the window 604 that is associated with the first meeting while listening to an audio feed from the second meeting.

Figure 9:
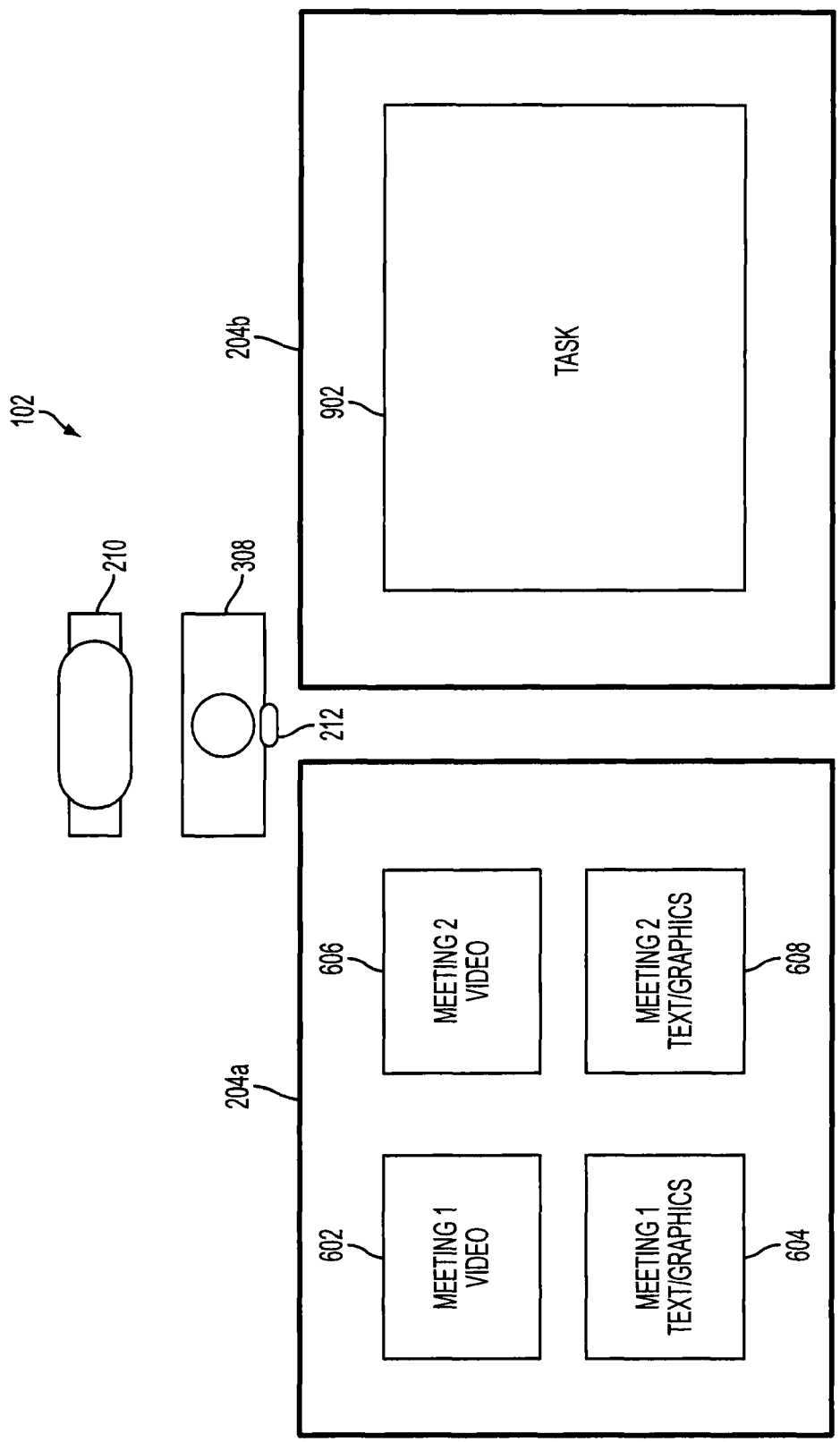
FIG. 9 illustrates another exemplary configuration of the user interface.

The methods described above may also be used and applied to a single meeting. For example, the CIV values or user attention estimates may be used while the user is participating in a single virtual meeting and also a real meeting or other real tasks. For example, FIG. 9 illustrates an exemplary configuration of the user interface similar to the configuration described above in FIG. 6. The user interface 102 includes an email program that is presented in a window on the second display 204b. The user may interact with a task window 902 such as, for example, an email program to conduct, for example, business not related to the first meeting or the second meeting. When the user's attention is directed towards one of the meetings in a similar manner as described above in FIG. 7, the user interface 102 may be configured for more active user participation in a particular meeting. Thus, a user may perform any desired task while waiting for their needed participation in a meeting or prior to directing their attention to a particular meeting.

Figure 10A:
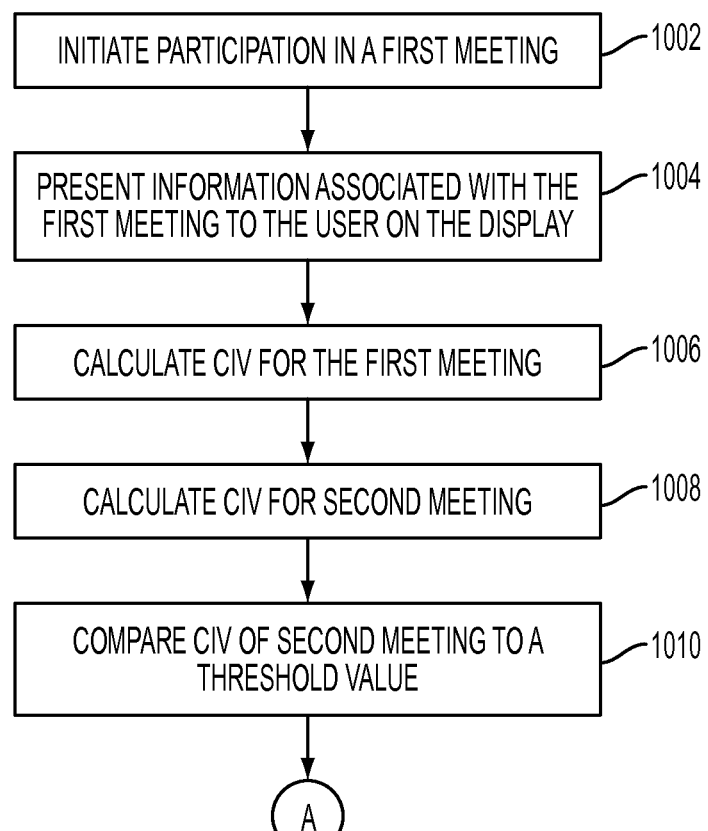
FIGS. 10A and 10B illustrate a block diagram of another exemplary method of operation of the user interface.
Figure 10B:
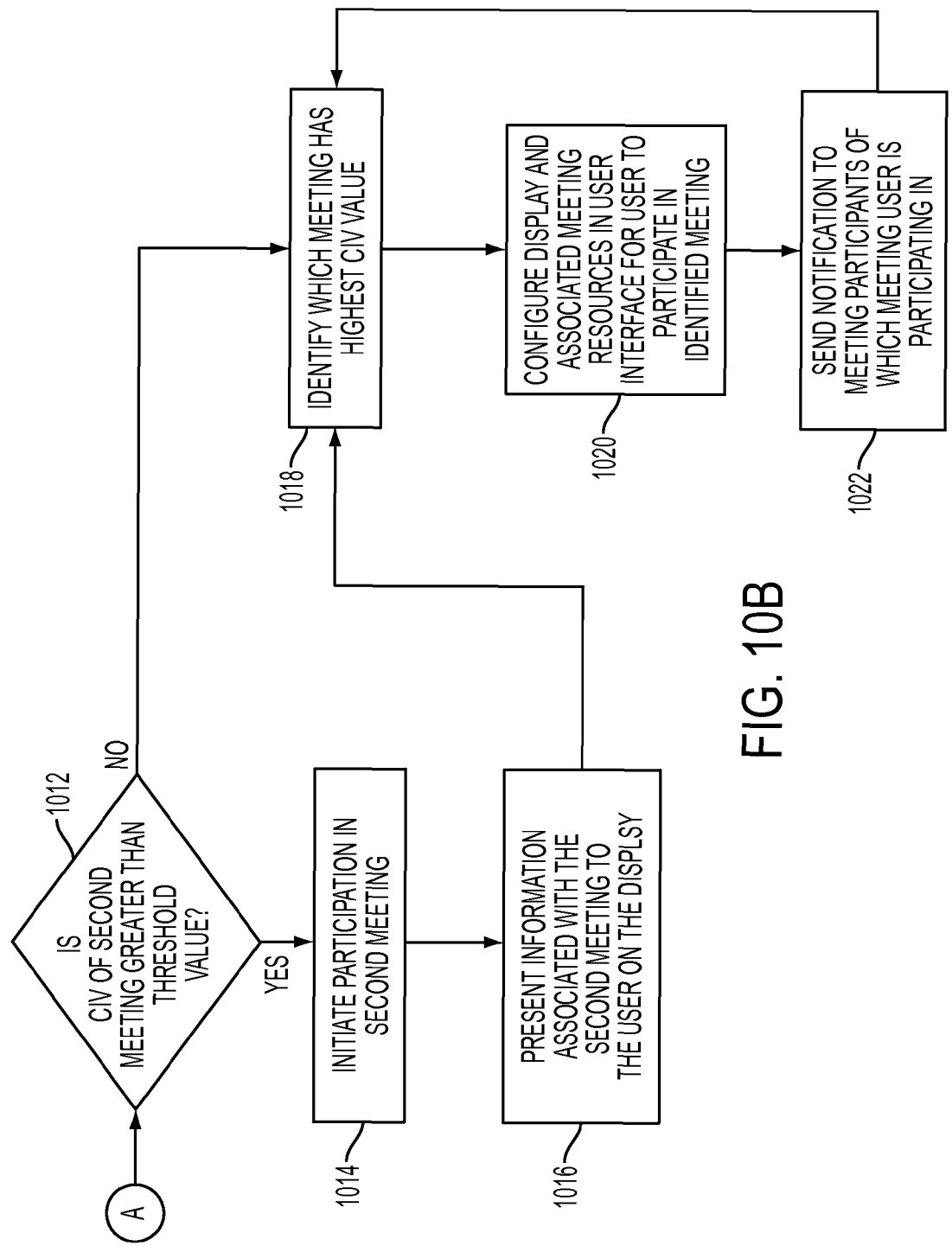

FIGS. 10A and 10B illustrate a block diagram of another exemplary method of operation of the user interface 102 (of FIG. 1). In this regard, a user may be invited to participate in a third meeting according to the relative CIV value of the third meeting and the other meetings the user may be participating in. Referring to FIG. 10A, the blocks 1002 to 1010 are similar to the blocks 502-510 described above in FIG. 5. In block 1008 a CIV is calculated for a second meeting. The second meeting may be a meeting that the user is not participating in, but may be invited to by other users in the second meeting. In block 1010, the CIV of the second meeting is compared to a threshold value. The threshold value may be a value set by the user or the system administrator. Alternatively, the threshold value may be determined by the CIV values of the other meetings the user is participating in. For example, the highest CIV value of the other meetings the user is participating in may be set as the threshold value. Referring to FIG. 10B, in block 1002, the user interface 102 determines whether the CIV of the second meeting is greater than the threshold value. If yes, participation in the second meeting is initiated in block 1014, and information associated with the second meeting is presented to the user on the display 1016. In block 1018, the meeting having the highest CIV value is identified by comparing the CIV values of the meetings (e.g., comparing the CIV of the first meeting with the second meeting or comparing the CIVs of the first meeting, the second meeting and a third meeting). The display and the user interface are configured in block 1020 for the user to participate in the identified meeting with the highest CIV value. In block 1022, a notification of the user's participation in a particular meeting may be sent to the user interfaces 102 of other meeting participants in a similar manner as discussed above in block 416 (of FIG. 4).

Figure 11:
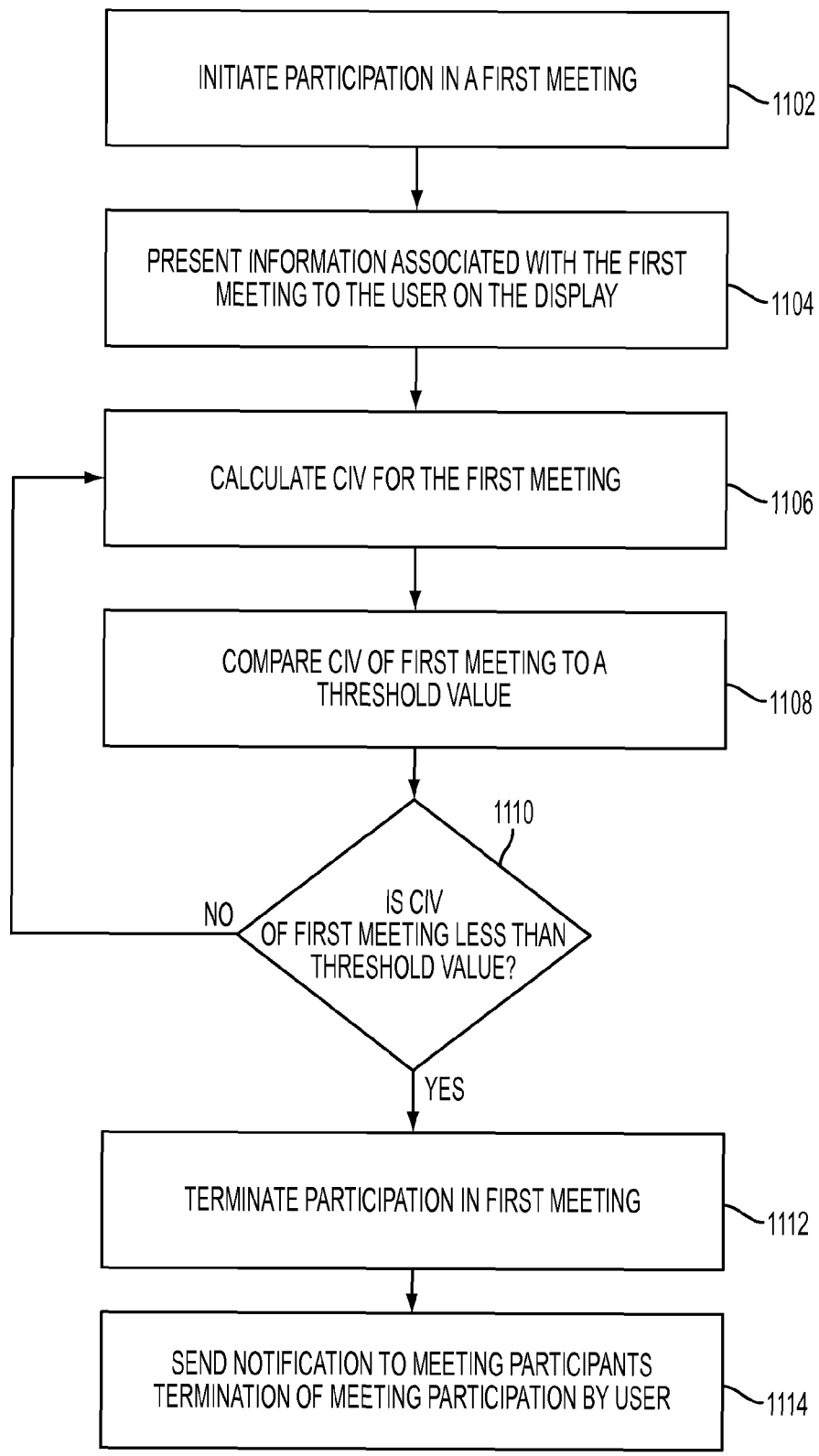
FIG. 11 illustrates a block diagram of another exemplary method of operation of the user interface.

FIG. 11 illustrates a block diagram of another exemplary method of operation of the user interface 102 (of FIG. 1). In this regard, in block 1102 participation is initiated in a first meeting. Information associated with the first meeting is present to the user on the display in block 1104. In block 1106, a CIV is calculated for the first meeting. In block 1108, the CIV associated with the first meeting is compared to a threshold value. Block 1110 determines whether the CIV of the first meeting is less than the threshold value. If yes, in block 1112, the participation of the user in the first meeting is terminated. In block 1114, a notification that the user has terminated participation in the first meeting may be sent to the user interfaces 102 of the other meeting participants.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for managing virtual meetings, the method comprising:
    initiating participation with a first user interface in a first meeting;
    initiating participation with the first user interface in a second meeting;
    calculating a first composite interest value (CIV) associated with the first meeting and a second CIV associated with the second meeting, wherein the first CIV is a function of a crowd importance estimate (CIE) and an automatic importance estimate (AIE), the automatic importance estimate including a value associated with a relative importance of the subject matter of the first meeting, a value associated with a number of participants of the first meeting, and a value associated with a relative importance of a position within an organization of the participants of the first meeting, wherein the function includes applying weighting factors to both the CIE and AIE that are based on identified habits of the first user;
    determining whether the first CIV is greater than the second CIV;
    configuring the user interface such that the user interacts with meeting resources associated with the first meeting responsive to determining that the first CIV is greater than the second CIV, wherein the user interface is further configured to display both a video feed associated with the first meeting and a video feed associated with the second meeting,
    transmitting a first notification of the first user's participation in the first meeting to user interfaces of other participants of the first meeting responsive to determining that the first CIV is greater than the second CIV, wherein the first notification indicates that the first user is attentive to the first meeting;
    transmitting a second notification of the first user's participation in the second meeting to user interfaces of other participants of the second meeting responsive that the first CIV is greater than the second CIV, wherein the second notification indicates that the first user is not attentive to the second meeting;
    determining whether the first CIV or the second CIV has a value less than a threshold value; and
    terminating the meeting associated with the identified CIV having a value less than the threshold value.

2. The method of claim 1, further comprising configuring the user interface such that the user interacts with meeting resources associated with the second meeting responsive to determining that second CIV is greater than the first CIV.

3. The method of claim 1, wherein the first CIV is a function of a user importance estimate (UIE), the user importance estimate including a value associated with data associated with the meeting and data associated with a user profile associated with the user.

4. The method of claim 1, wherein the first CIV is a function of the AIE, a UIE, and a CIE.

5. The method of claim 1, further comprising presenting information associated with the first meeting on a display of the first user interface following initiating participation with the first user interface in the first meeting.

6. The method of claim 5, further comprising presenting information associated with the second meeting on a display of the first user interface following initiating participation with the first user interface in the second meeting.

7. The method of claim 1, wherein the configuring the user interface such that the user interacts with meeting resources associated with the first meeting includes outputting an audio feed associated with the first meeting to the user via the user interface.

8. A method for managing virtual meetings, the method comprising:
- initiating participation with a first user interface in a first meeting;
- calculating a first composite interest value (CIV) associated with the first meeting, wherein the first CIV is a function of a crowd importance estimate and an automatic importance estimate (AIE), the automatic importance estimate including a value associated with a relative importance of the subject matter of the first meeting, a value associated with a number of participants of the first meeting, and a value associated with a relative importance of a position within an organization of the participants of the first meeting, wherein the function includes applying weighting factors to both the CIE and AIE that are based on identified habits of the first user;
- calculating a second CIV associated with a second meeting;
- determining whether the second CIV is greater than a threshold value;
- initiating participation with the first user interface in the second meeting responsive to determining that the second CIV is greater than the threshold value, wherein the first user interface is configured to display both a video feed associated with the first meeting and a video feed associated with the second meeting;
- transmitting a first notification of the first user's participation in the first meeting to user interfaces of other participants of the first meeting responsive to determining that the second CIV is greater than the threshold value, wherein the first notification indicates that the first user is not attentive to the first meeting;
- transmitting a second notification of the first user's participation in the second meeting to user interfaces of other participants of the second meeting responsive to determining that the second CIV is less than the threshold value, wherein the second notification indicates that the first user is attentive to the second meeting;
- determining whether the first CIV or the second CIV has a value less than a second threshold value; and
- terminating the meeting associated with the identified CIV having a value less than the second threshold value.

9. The method of claim 8 further comprising:
- identifying a CIV with the greatest value; and
- configuring the user interface such that the user interacts with meeting resources associated with the meeting associated with the identified CIV with the greatest value.

* * * * *